United States Patent [19]

Uchiyama

[11] Patent Number: 4,982,219
[45] Date of Patent: Jan. 1, 1991

[54] FOCUS DETECTING DEVICE

[75] Inventor: Shigeyuki Uchiyama, Tokyo, Japan

[73] Assignee: Nikon Corporation, Tokyo, Japan

[21] Appl. No.: 497,779

[22] Filed: Mar. 21, 1990

Related U.S. Application Data

[63] Continuation of Ser. No. 370,993, Jun. 26, 1989, abandoned.

[30] Foreign Application Priority Data

Jul. 7, 1988 [JP] Japan .............................. 63-170556
Feb. 16, 1989 [JP] Japan .................... 1-37927

[51] Int. Cl.$^5$ ............................................. G03B 13/36
[52] U.S. Cl. ................................... 354/408; 354/406
[58] Field of Search ....................... 354/406, 407, 408

[56] References Cited

U.S. PATENT DOCUMENTS 4,746,948 5/1988 Matsui .................................. 354/408
4,835,561 5/1989 Matsui .................................. 354/406
4,859,842 8/1989 Suda et al. ........................... 354/408

FOREIGN PATENT DOCUMENTS 62-174710 8/1987 Japan .

Primary Examiner—Russell E. Adams
Attorney, Agent, or Firm—Shapiro and Shapiro

[57] ABSTRACT

A focus detecting device is provided with an objective lens, a re-imaging device for separating the optical image of an object obtained through the objective lens into a plurality of identical secondary optical images and re-imaging the same, a first photodetector device for detecting two of the secondary optical images and outputting relative position information thereof, a second photodetector device for detecting at least one of the secondary optical images and outputting photodetection information (e.g., infrared) of the at least one optical image, and a correcting device for correcting the relative position information on the basis of the photodetection information.

16 Claims, 7 Drawing Sheets

FOCUS DETECTING DEVICE

This is a continuation of application Ser. No. 370,993 filed June 26, 1989, now abandoned.

BACKGROUND OF THE INVENTION

1. Field of the Invention

This invention relates to a focus detecting device for use in a single-lens reflex camera or the like.

2. Related Background Art

Figure 13:
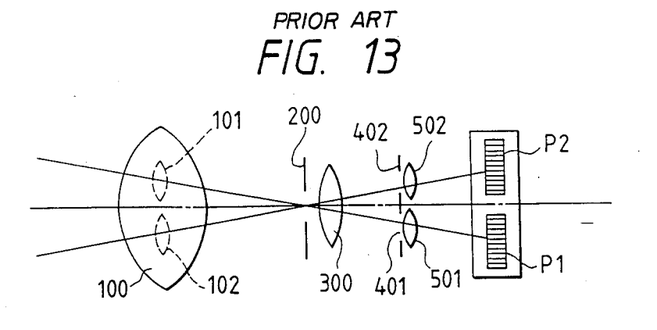

FIG. 13 of the accompanying drawings shows an example of a conventional focus detecting device of a camera which detects the deviation between two images formed by dividing the pupil of an objective lens and discriminates the focus-adjusted state of the objective lens.

A light flux which has entered through the area 101 of an objective lens 100 passes through a field mask 200, a field lens 300, a stop opening portion 401 and a re-imaging lens 501 and is imaged on an image sensor array P1. Likewise, a light flux which has entered through the area 102 of the objective lens 100 passes through the field mask 200, the field lens 300, an opening portion 402 and a re-imaging lens 502 and is imaged on an image sensor array P2. The pair of optical images formed on the image sensor arrays P1 and P2 are positioned away from each other in the so-called front focus state in which the focus-adjusted state of the objective lens 100 is such that a sharp image of an object is formed forwardly of the predetermined focal plane thereof, and conversely approach each other in the rear focus state in which a sharp image of the object is formed rearwardly of the predetermined focal plane, and the optical images fall in line with each other at a predetermined interval intermediate said two positions when a sharp image of the object is formed on the predetermined focal plane. Accordingly, by photoelectrically converting the respective optical images by the image sensor arrays P1 and P2, and operation-processing these signals to find the amount of deviation between the pair of optical images, the focus-adjusted state of the objective lens 100 can be known.

In such a focus detecting system, reliable focus detection cannot be accomplished unless the optical images formed on the image sensor arrays have a contrast greater than a certain degree. Noting that an object to be photographed has a higher contrast in the horizontal direction than in the vertical direction, it is the usual practice to dispose a pair of image sensors P1 and P2 in the horizontal direction X as shown in FIG. 14A of the accompanying drawings, and effect focus detection by the contrast in the horizontal direction.

Figure 14A:
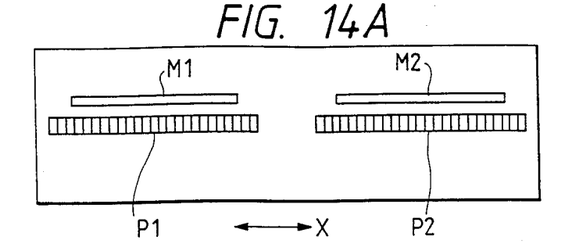
Figure 14B:
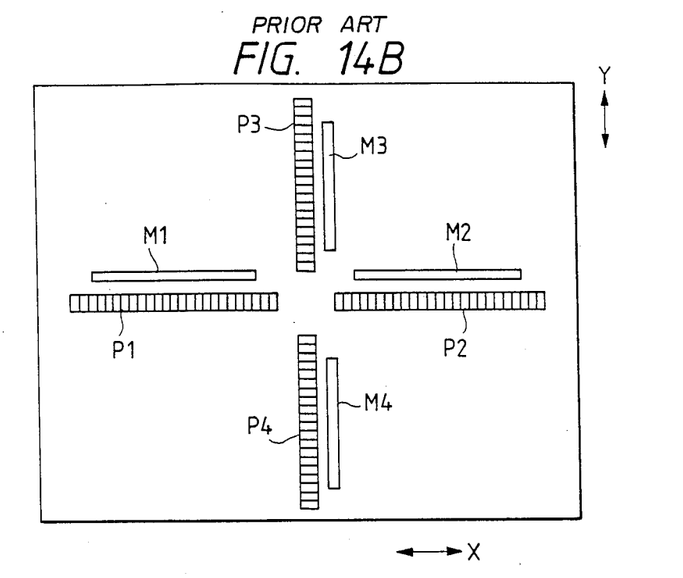

There is also known a system in which, in a case where the contrast in the horizontal direction is low and the contrast in the vertical direction is high or a case where a camera is used in its vertical position, a pair of image sensor arrays P1 and P2 and a pair of image sensor arrays P3 and P4 are disposed in the horizontal direction X and the vertical direction Y, respectively, as shown in FIG. 14B of the accompanying drawings, whereby focus detection is made possible for the contrast in either direction.

In such a focus detecting device, where the photo-taking lens has infrared aberration, different focus detection, is effected for light of different wavelengths. More particularly, many photoelectric converting portions of image sensor arrays, for example, are P-N junction type photodiodes, and the sensitivity thereof extends from the visible range to the near-infrared range. Therefore, comparing a case where an object is illuminated by a light source of low color temperature such as a tungsten lamp and a case where the object is illuminated by a light source of high color temperature such as daylight or a fluorescent lamp, different focus detection is effected depending on the infrared aberration of the photo-taking lens. Particularly, where the photo-taking lens is a long-focus lens, the infrared aberration is great, and when focus detection is effected with a long-focus lens mounted on a single-lens reflex camera, the occurrence of focus detection error due to the infrared aberration is substantial, and depending on the light source, there arises a difference as great as several hundreds of microns on the film surface and focus detection cannot be accomplished accurately.

So, in the focus detecting device disclosed, for example, in Japanese Laid-Open patent application No. 62-174710, as shown in FIG. 14A of the accompanying drawings, photosensors M1 and M2 are disposed near the image sensor arrays P1 and P2, respectively, and the proportion of the infrared light in the incident light flux is found on the basis of signals from the photosensors M1 and M2, whereby the result of focus detection found from the outputs of the image sensor arrays P1 and P2 is corrected to thereby suppress the influence of infrared aberration.

Also, in the above-described focus detecting device wherein pairs of image sensor arrays P1, P2 and P3, P4 are disposed in the horizontal and vertical directions, respectively, photosensors M1, M2, M3 and M4 may be disposed for the image sensor arrays P1, P2, P3 and P4, as shown in FIG. 14B. That is, for the horizontal direction, the photosensors M1 and M2 are disposed near the image sensor arrays P1 and P2, respectively, and the proportion of infrared light included in the incident light is detected by the signals from the pair of photosensors M1 and M2, and for the vertical direction, the photosensors M3 and M4 are disposed near the image sensor arrays P3 and P4, respectively, and the proportion of infrared light included in the incident light is detected by the signals from the photosensors M3 and M4.

Figure 15A:
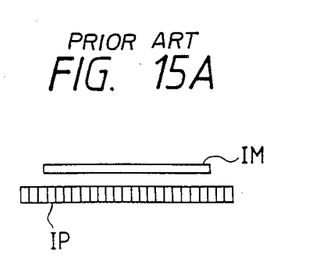
Figure 15B:
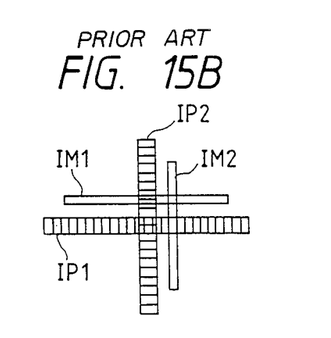

However, if the focus detecting optical system of FIG. 13 is used and the photosensors are disposed as shown in FIGS. 14A and 14B, the focus detecting area in which the image sensor arrays are disposed and the infrared light detecting area in which the photosensors are disposed do not coincide with each other. That is, in the arrangement of the image sensor arrays P1 and P2 and the photosensors M1 and M2 shown in FIG. 14A, the image IP of the image sensor arrays P1 and P2 formed on the predetermined focal plane of the photo-taking lens 101 (objective lens) through the re-imaging lenses 501 and 502 and the field lens 300 and the image IM of the photosensors M1 and M2 vertically deviate from each other as shown in FIG. 15A of the accompanying drawings. This means that the focus detecting area IP and the infrared light detecting area IM do not coincide with each other, and where the object is irradiated with various light sources and the distribution of the infrared light of the light flux entering through the photo-taking lens is not uniform, there is the problem that accurate detection of the infrared light is not accomplished and wrong correction of infrared aberration is effected Likewise in the case of FIG. 14B, the focus detecting area and the infrared light detecting area deviate from each other as shown in FIG. 15B of the accompanying drawings and the same problem arises. In FIG. 15B, IP1 designates the image of the image sensor arrays P1 and P2 as they overlap each other, IP2 denotes the image of the image sensor arrays P3 and P4 as they overlap each other, IM1 designates the image of the photosensors M1 and M2 as they overlap each other, and IM2 denotes the image of the photosensors M3 and M4 as they overlap each other, and with respect to the horizontal direction, the focus detecting area IP1 and the infrared light detecting area IM1 vertically deviate from each other, and with respect to the vertical direction, the focus detecting area IP2 and the infrared light detecting area IM2 horizontally deviate from each other.

SUMMARY OF THE INVENTION

The present invention has been made in view of the above-noted problems and an object thereof is to provide a focus detecting device which is designed such that the focus detecting area and the light detecting area for correcting the result of focus detection such as infrared light overlap each other, whereby accurate correction can be accomplished.

Another object of the present invention is to solve the above-noted problems by a focus detecting device provided with re-imaging means for separating the optical image of an object obtained through an objective lens into a plurality of identical secondary optical images and re-imaging the same, first photodetector means for detecting two of said secondary optical images and outputting information regarding the relative position thereof, second photodetector means for detecting at least one of said secondary optical images and outputting photodetection information regarding said at least one optical image, and correcting means for correcting said relative position information on the basis of said photodetection information.

Still another object of the present invention is to provide a focus detecting device with a re-imaging optical system for re-imaging the optical image of an object formed by an objective lens on a predetermined focal plane thereof as at least three identical optical images, a pair of image sensors for photoelectrically converting a pair of said three optical images, a correcting sensor for photoelectrically converting the remaining one of said three optical images and outputting a correction signal conforming to a correction factor such as the color temperature of said remaining optical image, and focus detecting means for detecting the relative displacement of the pair of optical images on the basis of the outputs of the pair of image sensors and the output of the correcting sensor, to thereby solve the above-noted problems.

Yet another object of the present invention is to provide a focus detecting device in which an optical image on a predetermined focal plane of an objective lens is separated by a focus detecting optical system into a pair of optical, images whose relative spacing on a focus detecting surface changes in a predetermined direction in conformity with the focus-adjusted state of the objective lens and which are spaced apart from each other by a predetermined distance with at least the optic axis of the objective lens interposed therebetween, the pair of optical images are converted into electrical signals by a pair of image sensors disposed on the focus detecting surface to thereby detect the focus-adjusted state, an optical image on a correcting sensor disposed on the focus detecting surface is converted into an electrical signal by the correcting sensor to thereby obtain a correction signal, and the outputs of the image sensors are corrected by said correction signal.

A further object of the present invention is to solve the above-noted problems by disposing the correcting sensor on the focus detecting surface at a substantially intermediate position between the pair of image sensors without overlapping said image sensors and in parallelism thereto, and constructing the focus detecting optical system so that the pair of image sensors and the correcting sensor are imaged in overlapping relationship with one another on a predetermined focal plane of the objective lens.

Still a further object of the present invention is to solve the above-noted problems by a focus detecting device provided with a re-imaging optical system for re-imaging the optical image of an object formed by an objective lens on a predetermined focal plane thereof as at least four identical optical images, a pair of image sensors for photoelectrically converting a pair of said four optical images, a pair of correcting sensors for photoelectrically converting the remaining pair of said four optical images and outputting correction signals conforming to correction factors such as the color temperatures of those optical images, and focus detecting means for detecting the relative displacement of the pair of optical images on the basis of the outputs of the pair of image sensors and the outputs of the pair of correcting sensors.

When the pair of image sensors and the correcting sensors are projected onto a predetermined focal plane of the objective lens through the focus detecting optical system, they are imaged in overlapping relationship with one another. Accordingly, the focus detecting area and the correction light detecting area overlap each other and therefore, when the result of focus detection obtained from the outputs of the pair of image sensors is corrected by the output of the correcting sensor, correction of higher accuracy than in the prior art becomes possible.

Also, particularly in the present invention, when the pair of image sensors and the pair of correcting sensors are projected onto a predetermined focal plane of the objective lens through the focus detecting optical system, they are imaged in overlapping relationship with one another. Thereby, an effect similar to that described above is obtained, and as compared with the case where a single correcting sensor is provided, the construction of the sensors becomes simple.

BRIEF DESCRIPTION OF THE DRAWINGS

FIGS. 2 to 6 illustrate an embodiment of the focus detecting device according to the present invention, FIG. 2 being a front view of an image sensor chip, FIG. 3A being a perspective view of a focus detecting optical system, FIG. 3B being a perspective view of the re-imaging lens thereof, FIGS. 4, 6A and 6B showing the projected images when image sensor arrays and color sensors on the image sensor chip are projected onto a predetermined focal plane of an objective lens by the focus detecting optical system, FIGS. 5A, 5B, 5C, 5D, 5E and 5F relating to the color sensors, FIG. 5A showing the construction thereof, FIGS. 5B and 5C being cross-sectional views of photodiodes, FIG. 5D being a graph showing the relative sensitivity characteristics of the photodiodes, FIG. 5E being a graph showing the spectral sensitivity characteristics of light sources such as a fluorescent lamp and a flat lamp, and FIG. 5F showing an object pattern having brightness and darkness.

FIGS. 7 to 9 illustrate another embodiment of the present invention, FIG. 7 being a front view of an image sensor chip, FIG. 8A being a front view of a field mask, FIG. 8B being a front view of a diaphragm, FIG. 8C being a front view of a re-imaging lens, and FIG. 9 showing the projected images of image sensor arrays and a color sensor on a predetermined focal plane of an objective lens.

FIGS. 13 to 15 illustrate an example of the prior art, FIG. 13 showing the general construction of a focus detecting device, FIGS. 14A and 14B being front views showing two examples of the image sensor chip, and FIGS. 15A and 15B showing the images formed when the image sensor arrays and color sensors on the image sensor chips shown in FIGS. 14A and 14B are projected onto a predetermined focal plane of an objective lens.

DESCRIPTION OF THE PREFERRED EMBODIMENTS

Figure 1:
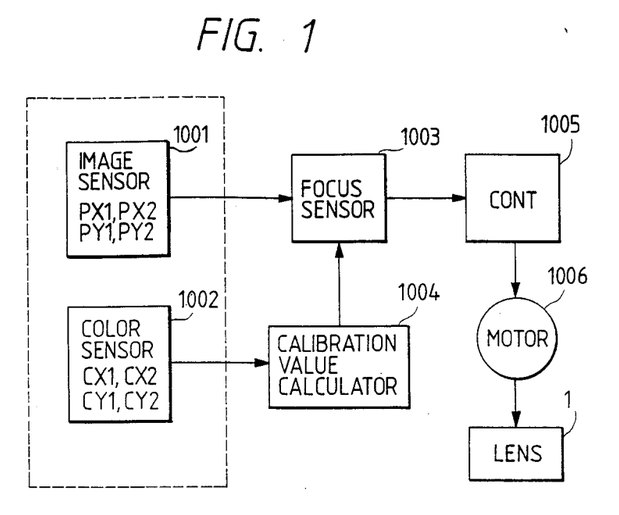
FIG. 1 is a block diagram showing the general construction of a focus detecting device according to the present invention.

FIG. 1 is a block diagram showing the general construction of a focus detecting device according to the present invention.

In FIG. 1, a calibration value calculator 1004 determines a calibration value for calibration of infrared aberration on the basis of the output of a color sensor 1002, and outputs it as information to a focus sensor 1003.

The focus sensor 1003 finds the amount of image surface deviation (the amount of deviation between the best image surface of an object formed by an objective lens and a predetermined imaging plane) on the basis of the output of an image sensor array 1001 and the calibration value from the calibration value calculator 1004, determines the direction and amount of movement of the objective lens 1 necessary to reduce the amount of image surface deviation to zero, and outputs them as information to a controller 1005.

The controller 1005 controls a motor 1006 in accordance with the direction and amount of movement of the objective lens determined by the focus sensor 1003, and moves the objective lens 1 to a predetermined position.

FIRST EMBODIMENT

A first embodiment of the present invention will hereinafter be described with reference to FIGS. 2 to 6.

Figures 3A, 3B:
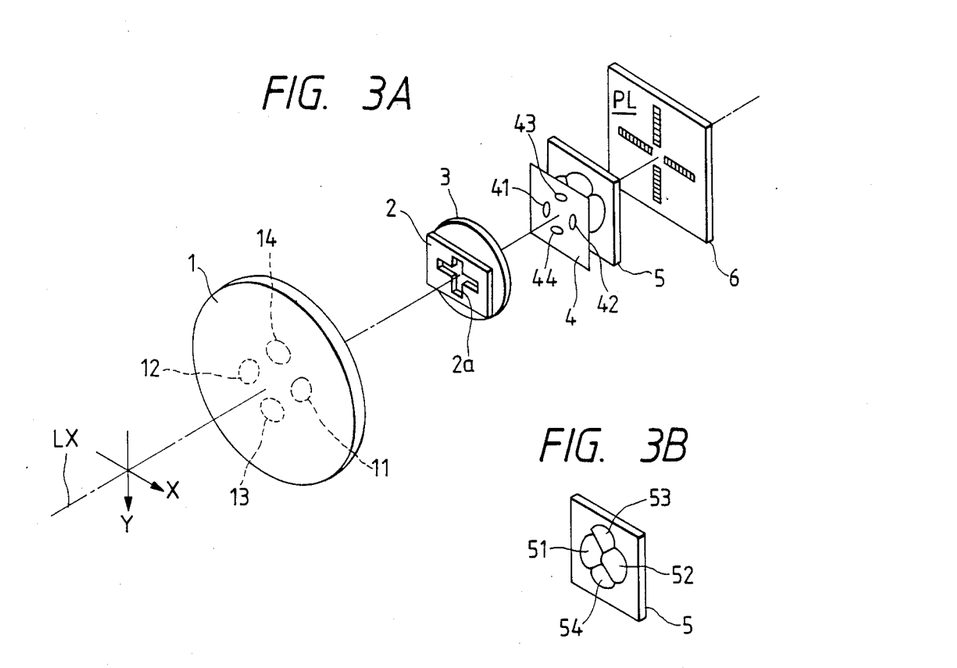

FIG. 3A shows an example of the optical system of the focus detecting device In this embodiment, a field mask 2, a field lens 3, a diaphragm 4, a re-imaging lens 5 and an image sensor chip 6 are disposed on the optic axis LX of a objective lens 1 in the named order. The field mask 2 has a cruciform opening 2a and is disposed near the predetermined focal plane of the objective lens 1 to control the image of an object formed by the objective lens 1. The diaphragm 4 has four openings 41–44, which are projected as diaphragm images 11–14 onto the objective lens 1 by the field lens 3. The re-imaging lens 5, as shown in FIG. 3B, comprises four lenses 51–54 corresponding to the openings 41–44 in the diaphragm 4, and causes the image of the field mask 2 to be formed on a focus detecting surface PL which is the surface of the image sensor chip 6.

Figure 2:
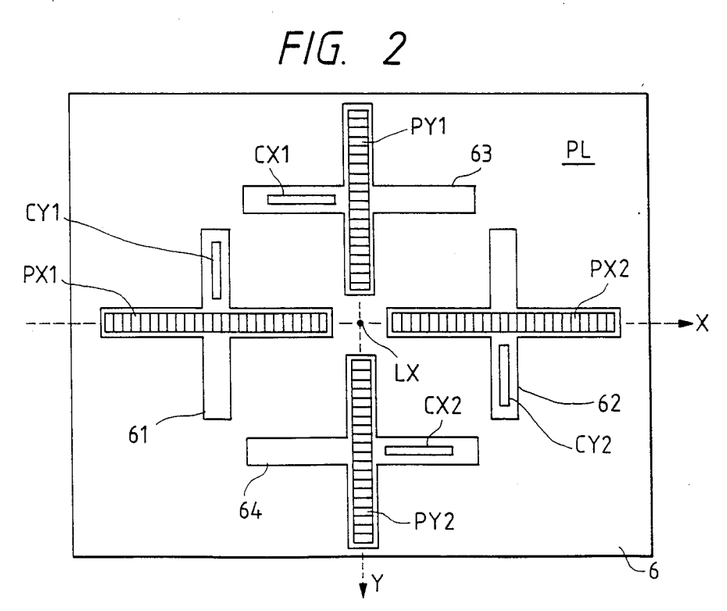

In such a focus detecting optical system, a light flux which has entered from the area 11 of the objective lens 1 passes through the field mask 2, the field lens 3, the opening 41 in the diaphragm 4 and the lens 51 of the re-imaging lens 5, and is imaged as a cruciform field mask image 61 on the image sensor chip 6, as shown in FIG. 2. Likewise, light fluxes which have entered from the areas 12–14 of the objective lens 1 are imaged as field mask images 62–64, respectively, on the image sensor chip 6, as shown in FIG. 2.

FIG. 2 is a front view of the image sensor chip 6 in this embodiment. Image sensor arrays PX1 and PX2 are disposed in the rectangular areas of the cruciform field mask images 61 and 62 which extend in a direction X, and image sensor arrays PY1 and PY2 are disposed in the rectangular areas of the field mask images 63 and 64 which extend in a direction Y, and the image sensor arrays PX1, PX2, PY1 and PY2 photoelectrically convert the field mask images 61, 62, 63 and 64, respectively, and output them as electrical signals.

The illumination distributions of the field mask images 61 and 62 move away from each other and from the Y-axis in FIG. 2 during so-called front focus in which the objective lens 1 forms a sharp image of the object forwardly of the predetermined focal plane, and move toward each other and toward the Y-axis during the so-called rear focus in which the objective lens 1 forms a sharp image of the object rearwardly of the predetermined focal plane, and become entirely equal to each other on the image sensor arrays PX1 and PX2 during in-focus in which the objective lens 1 forms a sharp image of the object on the predetermined focal plane. Accordingly, by the signals photoelectrically converted by the image sensor arrays PX1 and PX2 being operation-processed, the focus-adjusted state of the objective lens 1 in the direction X can be detected Likewise, the illumination distributions of the field mask images 63 and 64 move away from each other and from the X-axis during front focus, and move toward each other and toward the X-axis during rear focus, and become entirely equal to each other on the image sensor arrays PY1 and PY2 during in-focus. Consequently, by the signals photoelectrically converted by the image sensor arrays PY1 and PY2 being operation-processed, the focus-adjusted state of the objective lens 1 in the direction Y can be detected.

A color sensor CY1 is disposed in that portion of the rectangular area of the field mask image 61 which extends in the direction Y and above the X-axis, a color sensor CY2 is disposed in that portion of the rectangular area of the field mask image 62 which extends in the direction Y and below the X-axis, a color sensor CX1 is disposed in that portion of the rectangular area of the field mask image 63 which extends in the direction X and to the left of the Y-axis, and a color sensor CX2 is disposed in that portion of the rectangular area of the field mask image 64 which extends in the direction X and to the right of the Y-axis. That is, the color sensors CX1 and CX2 and the color sensors CY1 and CY2 are disposed point-symmetrically with respect to the optic axis LX of the objective lens 1.

If the image sensor arrays PX1, PX2, PY1, PY2 and the color sensors CX1, CX2, CY1, CY2 are disposed in the manner described above, as shown in FIG. 4 there are reversely projected onto the predetermined focal plane of the objective lens 1, i.e., the position of the field mask 2, an image IPX formed with the projected images of the image sensor arrays PX1 and PX2 overlapping each other, an image IPY formed with the projected images of the image sensor arrays PY1 and PY2 overlapping each other, the projected images ICX1 and ICX2 of the color sensors CX1 and CX2, and the projected images ICY1 and ICY2 of the color sensors CY1 and CY2. Here, the projected images ICX1 and ICX2 of the color sensors CX1 and CX2 are formed within the focus detecting area IPX in the horizontal direction, and the projected images ICY1 and ICY2 of the color sensors CY1 and CY2 are formed within the focus detecting area IPY in the vertical direction. Accordingly, the focus detecting area and the infrared light detecting area do not deviate from each other as in the prior art.

The color sensors CX1, CX2, CY1 and CY2 will now be described in detail with reference to FIGS. 5A, 5B, 5C, 5D, 5E and 5F. In the following, the color sensors are designated by the letter C.

Figure 5A:
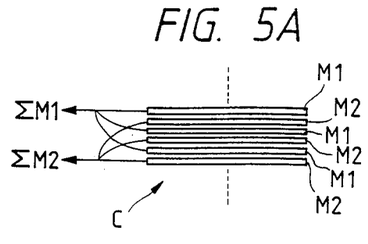
Figure 5B:
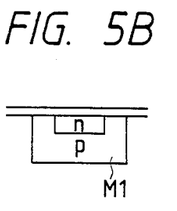
Figure 5C:
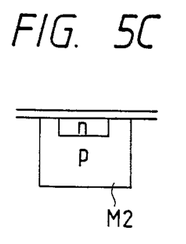
Figure 5D:
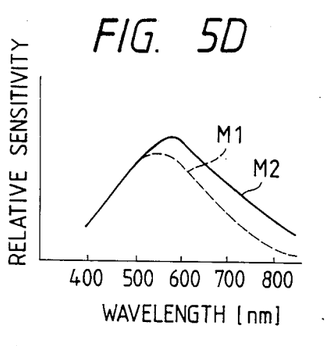
Figure 5E:
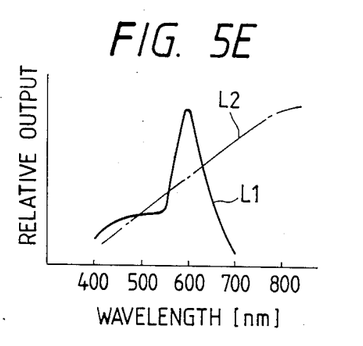
Figure 5F:
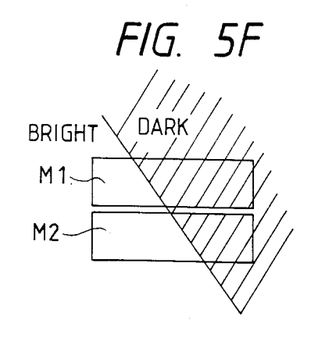

The color sensor C comprises a plurality of two kinds of photosensors M1 and M2 of different spectral sensitivity characteristics juxtaposed as shown in FIG. 5A. The photosensors M1 and M2 are photodiodes of PN junction structure shown in FIGS. 5B and 5C, respectively. The photosensor M2 is deeper in the P layer than the photosensor M1 and therefore, as indicated by a solid line M2 in FIG. 5D, as compared with a broken line M1, the sensitivity on the long wavelength side (the infrared light side) is higher. Accordingly, where the light entering the photosensors M1 and M2 is light such as from a fluorescent lamp which does not include a wavelength component of 700 nm or more, as indicated by a solid line L1 in FIG. 5E, the difference between the outputs of the photosensors M1 and M2 is small and the ratio therebetween has a value approximate to "1". In contrast, for light from a flat lamp which includes much of the infrared light component of 700 nm or more, as indicated by a dot-and-dash line L2 in FIG. 5E, the output of the photosensor M2 becomes greater than the output of the photosensor M1, and the ratio therebetween has a value far from "1". So, if the ratio between the sum total ΣM1 of the outputs of the photosensors M1 constituting the color sensor Cl and the sum total ΣM2 of the outputs of the photosensors M2 is taken, the proportion of the infrared light included in the light entering the color sensor C can be detected.

As shown in FIG. 5A, a plurality of photosensors M1 and M2 are alternately arranged to form a color sensor C, thereby reducing the influence of the pattern of the object entering the color sensor C. If as shown, for example, in FIG. 5F, a color sensor C is merely comprised of a photosensor M1 and a photosensor M2, when light of a bright and dark pattern inclined obliquely as shown enters, the quantity of light entering the photosensor M2 is greater than the quantity of light entering the photosensor M1. Even if the light entering these photosensors is light from a fluorescent lamp, for example, which includes very little infrared light, there is a difference between the outputs of the photosensors M1 and M2, and the ratio therebetween is as if the light is from a light source including much infrared light and thus a wrong judgment is formed as to the proportion of infrared light.

So, in the present embodiment, a plurality of photosensors M1 and M2 are alternately arranged to constitute a color sensor C and the ratio between the sum total ΣM1 of the outputs of the plurality of photosensors M1 and the sum total ΣM2 of the outputs of the plurality of photosensors M2 is found, thereby reducing the influence of the pattern of such an object.

In the focus detecting device thus constructed, as previously described, when the focus-adjusted state of the objective lens 1 is the in-focus state, the field mask images 61–64 in FIG. 2 assume the same luminance distribution. Accordingly, the optical image entering the color sensor CX1 is the same as the optical images entering the left half areas of the image sensor arrays PX1 and PX2, respectively, and likewise, the optical image entering the color sensor CX2 is the same as the optical images entering the right half areas of the image sensor arrays PX1 and PX2, respectively. As a result, the result of focus detection calculated by the outputs of the image sensor arrays PX1 and PX2 is corrected on the basis of the proportion of infrared light detected by the color sensors CX1 and CX2, whereby the infrared aberration can be reliably corrected and highly accurate focus detection is realized. The infrared light is detected by averaging the ratio between the sum totals of the outputs of the plurality of photosensors M1 and M2 constituting the color sensor CX1 and the ratio between the sum totals of the outputs of the plurality of photosensors M1 and M2 constituting the color sensor CX2.

For the direction Y, the optical image entering the color sensor CY1 is the same as the optical images entering the upper half areas of the image sensor arrays PY1 and PY2, respectively, and the optical image entering the color sensor CY2 is the same as the optical images entering the lower half areas of the image sensor arrays PY1 and PY2, respectively. Thus, the result of focus detection calculated by the outputs of the image sensor arrays PY1 and PY2 is corrected on the basis of the proportion of infrared light detected by the color sensors CY1 and CY2, whereby the infrared aberration can be reliably corrected and highly accurate focus detection is realized.

Figure 4:
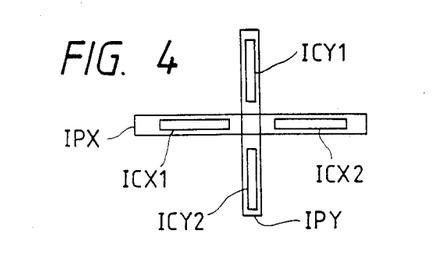
Figure 6A:
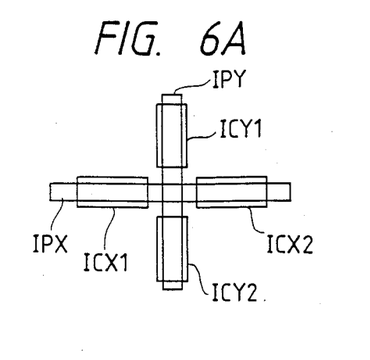

Although in the present embodiment, the width of the color sensors is made smaller than the width of the image sensor arrays so that as shown in FIG. 4, the infrared light detecting area overlaps the focus detecting area in such a manner as to be included in the latter, the width of the color sensors may be made greater than the width of the image sensor arrays so that as shown in FIG. 6A, the projected images ICX1, ICX2, ICY1 and ICY2 of the color sensors C may extend beyond the projected images IPX and IPY of the image sensor arrays.

Figure 6B:
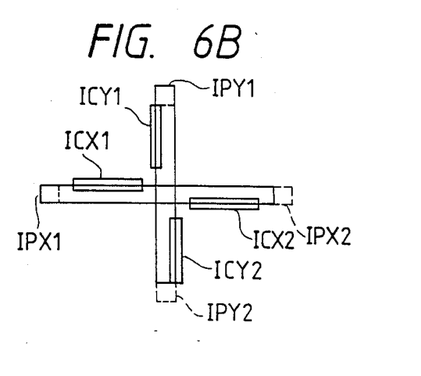

Due to an adjustment error or the like occuring when the optical system shown in FIG. 3 is actually mounted, the projected images IPX of the image sensor arrays PX1 and PX2 and the projected images IPY of the image sensor arrays PY1 and PY2 may not completely overlap on the predetermined focal plane, as shown in FIG. 4, and the projected images IPX1 and IPX2 of the image sensor arrays PX1 and PX2 on the predetermined focal plane may deviate horizontally and the projected images IPY1 and IPY2 of the image sensor arrays PY1 and PY2 deviate vertically, as shown in FIG. 6B. Also, the projected images ICX1 and ICX2 of the color sensors CX1 may and CX2 deviate vertically and horizontally, the projected images ICY1 and ICY2 of the color sensors CY1 and CY2 may deviate vertically and horizontally and the projected images ICX1, ICX2, ICY1 and ICY2 of the color sensors C may protrude from the projected images IPX1, IPX2, IPY1 and IPY2 of the image sensor arrays. However, if as shown in FIG. 6B, the projected images of the color sensors partly overlap the projected images of the image sensor arrays, more effective detection of infrared light can be expected than in the prior art, where detection of infrared light and focus detection are effected in completely independent areas.

SECOND EMBODIMENT

Figure 7:
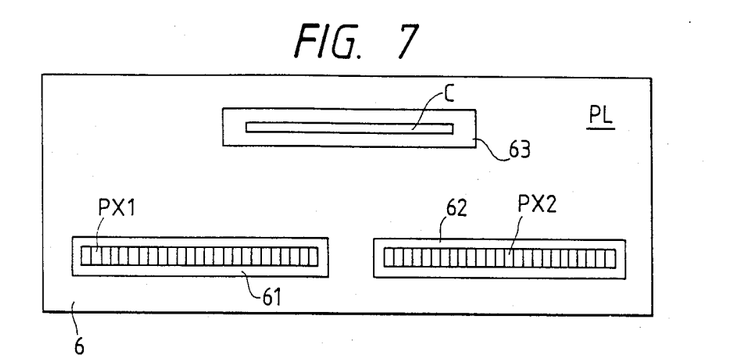

A second embodiment of the present invention will now be described with reference to FIGS. 7 to 9.

Figure 8A:
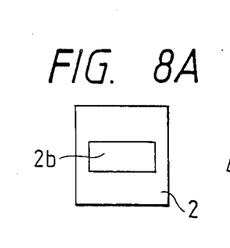
Figure 8B:
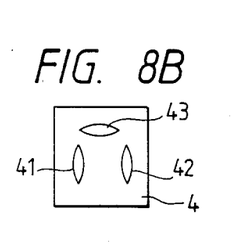
Figure 8C:
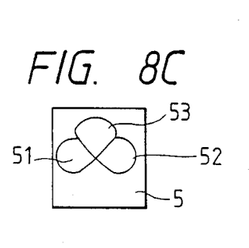
Figure 9:
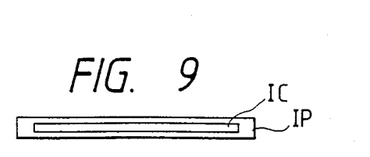

The basic construction of the focus detecting optical system is similar to that shown in FIG. 3, but as shown in FIG. 8A, a field mask 2' having a rectangular opening 26 is employed instead of the field mask 2, and as shown in FIG. 8B, a diaphragm 4' having three openings 41-43 is employed instead of the diaphragm 4, and as shown in FIG. 8C, a re-imaging lens 5' having three lenses 51-53 is employed instead of the re-imaging lens 5. In this optical, system, the openings 41-43 in the diaphragm 4' are projected as three images 11-13 (see FIG. 3) onto the predetermined focal plane of the objective lens 1 by the field lens 3, and these three images 11-13 are formed as field mask images 61-63 on the image sensor chip 6 by the re-imaging lens 5', as shown in FIG. 7. Accordingly, if image sensors PX1 and PX2 are disposed on the field mask images 61 and 62, respectively, and a color sensor C is disposed on the field mask image 63, the pair of image sensors PX1 and PX2 are projected as a projected image IP shown in FIG. 9 onto the predetermined focal plane of the objective lens 1 and the color sensor C is projected as a projected image IC within the projected image IP.

Therefore, the focus detecting area and the infrared light detecting area overlap each other, and if the proportion of infrared light is found from the color sensor C and the result of focus detection found from the outputs of the image sensors PX1 and PX2 is corrected by this value, infrared aberration can be accurately corrected.

In each of the above-described embodiments, the field mask 2 or 2', the field lens 3, the diaphragm 4 or 4' and the re-imaging lens 5 or 5' together constitute the focus detecting optical system, the image sensor arrays PX1, PX2, PY1 and PY2 together constitute the image sensor, and the color sensors CX1, CX2, CY1 and CY2 together constitute the correcting sensor.

THIRD EMBODIMENT

A third embodiment of the present invention will now be described with reference to FIGS. 10 to 12. In these figures, portions similar to those in FIG. 2 are given similar reference characters, and it is to be understood that the construction of the focus detecting optical system is similar to that shown in FIG. 3.

Figure 10:
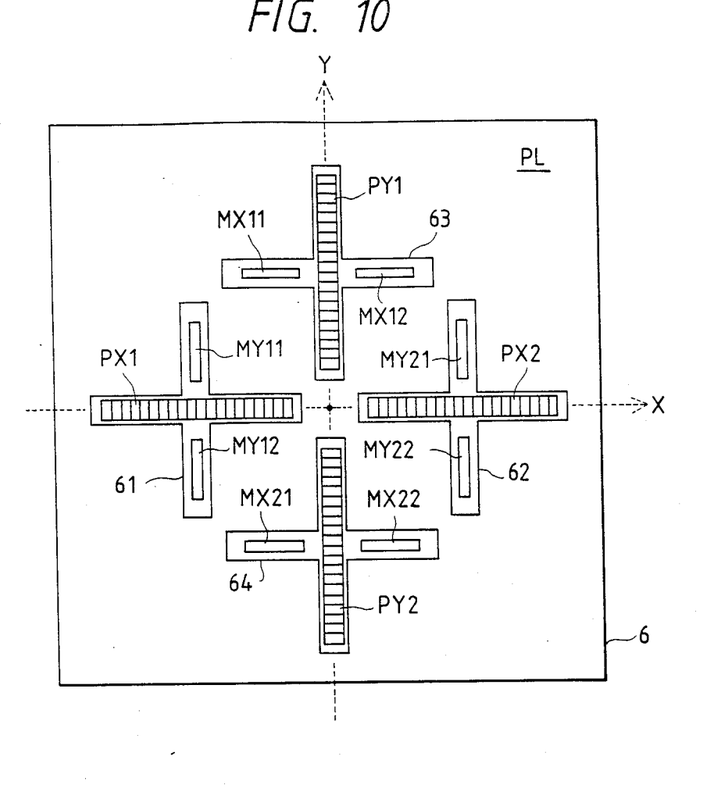
FIGS. 10 and 11 illustrate still another embodiment of the present invention, FIG. 10 being a front view of an image sensor chip, and FIG. 11 showing the projected images when image sensor arrays and color sensors on the image sensor chip are projected onto predetermined focal plane of an objective lens by a focus detecting optical system.

In FIG. 10, image sensor arrays PX1, PX2, PY1 and PY2 are disposed on the focus detecting surface PL of the image sensor chip 6 in the same manner as in FIG. 2, and these image sensor arrays photoelectrically convert field mask images 61-64 and output them as electrical signals.

Also, in the rectangular area of the field mask image 61 which extends in the direction Y, photosensors MY11 and MY12 are disposed with the image sensor array PX1 interposed therebetween, and in the rectangular area of the field mask image 62 which extends in the direction Y, photosensors MY21 and MY22 are disposed with the image sensor array PX2 interposed therebetween, and in the rectangular area of the field mask image 63 which extends in the direction X, photosensors MX11 and MX12 are disposed with the image sensor array PY1 interposed therebetween, and in the rectangular area of the field mask image 64 which extends in the direction X, photosensors MX21 and MX22 are disposed with the image sensor array PY2 interposed therebetween.

Each of these photosensors, the sensors MX11, MX12, MY11 and MY12 is like the photosensor M1 described in connection with FIG. 5, and each of the sensors MX21, MX22, MY21 and MY22 is like the photosensor M2 differing in spectral sensitivity from the photosensor M1. In FIG. 10, the sensors MX11 and MX21 differing in spectral sensitivity from each other and the sensors MX12 and MX22 also differing in spectral sensitivity from each other are disposed line-symmetrically with respect to the X-axis, and the sensors MY11 and MY21 differing in spectral sensitivity from each other and the sensors MY12 and MY22 also differing in spectral sensitivity from each other are disposed line-symmetrically with respect to the Y-axis. The sensors MX11 and MX21, the sensors MX12 and MX22, the sensors MY11 and MY21, and the sensors MY12 and MY22 respectively constitute four color sensors.

Figure 11:
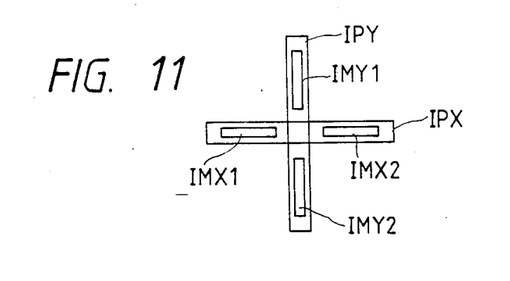
Figure 12A:
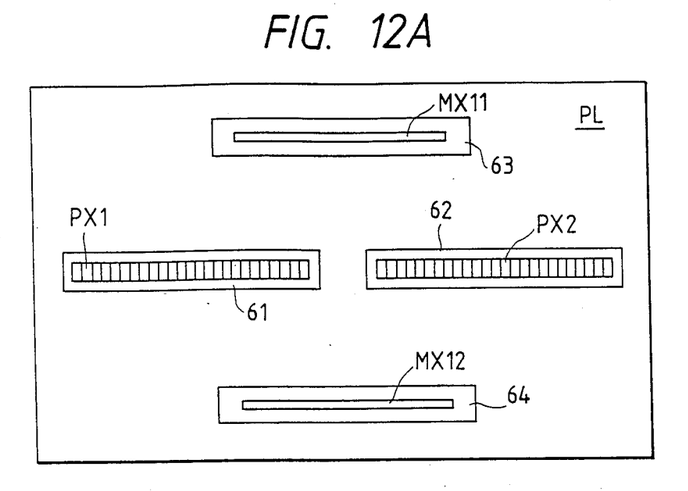
FIGS. 12A and 12B show a modification, and correspond to FIGS. 10 and 11, respectively.
Figure 12B:
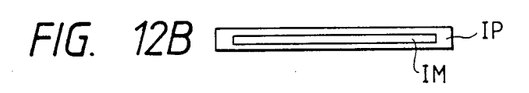

If the photosensors are so disposed, as shown in FIG. 11 an image IPX formed with the projected images of the image sensor arrays PX1 and PX2 overlapping each other and an image IPY formed with the projected images of the image sensor arrays PY1 and PY2 overlapping each other are imaged. Also, an image IMX1 formed with the projected images of the photosensors MX11 and MX21 overlapping each other, an image IMX2 formed with the projected images of the photosensors MX12 and MX22 overlapping each other, an image IMY1 formed with the projected images of the photosensors MY11 and MY22 overlapping each other, and an image IMY2 formed with the projected images of the photosensors MY12 and MY22 overlapping each other are imaged. The images IMX1 and IMX2 are formed in the horizontal focus detecting area IPX, and the images IMY1 and IMY2 are formed in the vertical focus detecting area IPY. Accordingly, the focus detecting area do not and the infrared light detecting area deviate from each other as in the prior art.

In the focus detecting device thus constructed, as previously described, when the focus-adjusted state of the objective lens 1 is the in-focus state, the field mask images 61-64 assume have the same luminance distribution. Accordingly, the optical images entering the photosensors MX11 and MX21 are the same as the optical images entering the left half areas of the image sensor arrays PX1 and PX2, respectively, and likewise, the optical images entering the photosensors MX12 and MX22 are the same as the optical images entering the right half areas of the image sensor arrays PX1 and PX2. Thus, the result of focus detection calculated by the outputs of the image sensor arrays PX1 and PX2 is corrected on the basis of the proportion of infrared light detected by the photosensors MX11 and MX21 and the photosensors MX12 and MX22, whereby infrared aberration can be reliably corrected and highly accurate focus detection is realized.

Here, the infrared light is detected from the ratio between the sum of the outputs of the photosensors MX11 and MX12 and the sum of the outputs of the photosensors MX21 and MX22. Alternatively, the infrared light may be detected by averaging the ratio between the outputs of the photosensors MX11 and MX21 and the ratio between the outputs of the photosensors MX12 and MX22.

For the direction Y, the optical images entering the photosensors MY11 and MY21 are the same as the optical images entering the upper half areas of the image sensor arrays PY1 and PY2, respectively, and likewise, the optical images entering the photosensors MY12 and MY22 are the same as the optical images entering the lower half areas of the image sensor arrays PY1 and PY2, respectively. Thus, the result of focus detection calculated by the outputs of the image sensor arrays PY1 and PY2 is corrected on the basis of the proportion of infrared light detected by the photosensors MY11 and MY21 and the photosensors MY12 and MY22, whereby infrared aberration can be reliably corrected and highly accurate focus detection is realized.

In the present embodiment, the color sensor is constituted by a pair of photosensors disposed at predetermined locations, and one of the pair of photosensors is constituted by the photosensor M1 shown in FIG. 5, and the other photosensor is constituted by a photosensor M2 differing in spectral sensitivity from the photosensor M1. Accordingly, the construction is simple as compared with the case where, as in the first embodiment, the photosensors M1 and M2 are alternately arranged on the same semiconductor substrate to thereby form a color sensor.

In the foregoing, the spectral sensitivities of the pair of photosensors are changed by changing the thickness of the layer P as shown in FIG. 5, but alternatively, optical filters of different spectral characteristics may be disposed, for example, on a pair of photosensors equal in the thickness of the layer P and equal in spectral sensitivity, whereby the spectral sensitivities of the pair of photosensors may be changed.

Also, as described above, the width of the photosensors may be made greater than the width of the image sensor arrays and they may be superposed one upon another so that the projected images of the photosensors extend beyond the projected images of the image sensor arrays. Further, even though the projected images of the photosensors protrude from the projected images of the image sensor arrays, if those projected images partly overlap each other, infrared light detection more effective than the prior art can be accomplished.

A description will now be given of a modification of this embodiment where a field mask 2' having a rectangular opening 2b as shown in FIG. 8A is used as the field mask of the focus detecting optical system. In this case, field mask images 61-64 as shown in FIG. 12A are formed on the image sensor chip 6. Accordingly, if image sensors PX1 and PX2 are disposed on the field mask images 61 and 62, respectively, and a photosensor MX11 is disposed on the field mask image 63 and a photosensor MX21 is disposed on the field mask image 64, the pair of image sensors PX1 and PX2 are superposedly projected as a projected image IP shown in FIG. 12B on the predetermined focal plane of the objective lens 1 and the photosensors MX11 and MX21 are superposedly projected as a projected image IM in the projected image IP.

Therefore, the focus detecting area and the infrared light detecting area overlap each other, and if the proportion of infrared light is found from the photosensors MX11 and MX21 and the result of focus detection found from the outputs of the image sensors PX1 and PX2 is corrected by this value, infrared aberration can be accurately corrected.

While in the foregoing description color sensors for detecting infrared light to correct infrared aberration are provided on the image sensor chip, the present invention can also be applied to a focus detecting device in which, instead of such color sensors, photodiodes equal in the relative sensitivity for the wavelength of the incident light to the image sensor arrays PX1, PX2, PY1 and PY2 are disposed separately to monitor the quantity of light entering the image sensor arrays.

According to the present invention, the correcting light detecting area for correcting the result of focus detection calculated from the output of a pair of image sensors (for example, infrared aberration correction) and the focus detecting area overlap each other, and therefore, highly accurate correction becomes possible. More particularly according to the present invention, correction may be effected by a pair of correcting sensors differing in spectral sensitivity from each other and therefore, the construction of the correcting sensors can be simplified.

I claim:

1. A focus detecting device comprising:
   an objective lens;
   re-imaging means for separating the optical image of an object obtained,, through said objective lens into a plurality of substantially identical secondary optical images and re-imaging the same;
   first photodetector means for detecting two of said secondary optical images and outputting relative position information thereof;
   second photodetector means for detecting at least one of said secondary optical images and outputting photodetection information of said at least one optical image; and
   correcting means for correcting said relative position information on the basis of said photodetection information.

2. A focus detecting device comprising:
   an objective lens;
   re-imaging means for separating the optical image of an object obtained through said objective lens into at least three substantially identical secondary optical images and re-imaging the same;
   first photodetector means for detecting two of said secondary optical images and outputting relative position information thereof;
   second photodetector means for detecting at least one of said secondary optical images, detecting the proportion of infrared light included in said at least one optical image, and outputting it as photodetection information; and
   correcting means for correcting said relative position information on the basis of said photodetection information.

3. A focus detecting device according to claim 2, wherein said first photodetector means includes four image sensor for detecting the quantity of light, said image sensors being radially provided about the optic axis of said objective lens so as to be orthogonal to adjacent image sensors, said second photodetector means includes at least one color sensor disposed substantially at an intermediate position of one of said four image sensors without overlapping said one image sensor and perpendicularly thereto, and said re-imaging means includes a field mask having an opening, a field lens, a diaphragm member having four diaphragm portions, and a re-imaging lens having four lenses.

4. A focus detecting device according to claim 3, wherein said color sensor is comprised of two kinds of photosensors of different spectral characteristics alternately combined.

5. A focus detecting device according to claim 2, wherein said first photodetector means includes two image sensors for detecting the quantity of light, said second photodetector means includes a color sensor for detecting the wavelength of light, said color sensor being disposed substantially at an intermediate position between said image sensors without overlapping said image sensors and in parallelism thereto, and said re-imaging means comprises a field mask having an opening, a field lens, a diaphragm member having three diaphragm portions, and a re-imaging lens having three lenses.

6. A focus detecting device according to claim 5, wherein said color sensor is comprised of two kinds of photosensors of different spectral characteristics alternately combined.

7. A focus detecting device according to claim 5, wherein said color sensor has a length substantially equal to the length of said image sensors.

8. A focus detecting device according to claim 2, wherein said first photodetector means includes two image sensors for detecting the quantity of light, said second photodetector means includes two color sensors for detecting the wavelength of light, said color sensors being disposed substantially at intermediate positions between said image sensors and parallel to each other with said image sensors interposed therebetween, and said re-imaging means includes a field mask having an opening, a field lens, a diaphragm member having four diaphragm portions, and a re-imaging lens having four lenses.

9. A focus detecting device according to claim 8, wherein said two color sensors have different spectral characteristics from each other.

10. A focus detecting device according to claim 2, wherein said at least re-imaging means forms said three secondary optical images at different positions on a detecting surface, said first photodetector means includes a pair of image sensors provided at positions on said detecting surface which correspond to two of said secondary optical images, said second photodetector means includes a color sensor provided at a position on said detecting surface which corresponds to the remaining at least one of said secondary optical images.

11. A focus detecting device according to claim 10, wherein said pair of image sensors, said color sensor and their images reversely projected onto the imaging plane of said objective lens by said re-imaging means are disposed so that they are superposed one upon another on the imaging plane of said objective lens.

12. A focus detecting device comprising:
an objective lens;
re-imaging means for separating the optical image of an object obtained through said objective lens into at least three substantially identical secondary optical images and re-imaging the same;
position detector means for detecting first and second optical images of said three secondary optical images and outputting relative position information thereof;
color detector means for detecting a third optical image of said three secondary optical images different from said first and second optical images, and outputting color information thereof; and
means for correcting said relative position information on the basis of said color information.

13. A focus detecting device comprising:
an objective lens;
re-imaging means for separating the optical image of an object obtained through said objective lens into at least four substantially identical secondary optical images and re-imaging the same;
position detector means for detecting a first pair of said four secondary optical images and outputting relative position information thereof;
color detector means for detecting a second pair of said four secondary optical images different from said first pair, and outputting color information thereof; and
means for correcting said relative position information on the basis of said color information.

14. A focus detecting device according to claim 13, wherein said color detector means produces first color information on the basis of one of said second pair of said secondary optical images and second color information on the basis of the other of said second pair of said secondary optical images.

15. A focus detecting device according to claim 13, wherein said color detector means includes first and second color sensor means for outputting first and second photodetection information, respectively.

16. A focus detecting device according to claim 15, wherein said first color sensor means has a first spectral characteristic and said second color sensor means has a second spectral characteristic different from said first spectral characteristic.

* * * * *